3,317,456
HEAT-SHRINKABLE ORGANOSILICON MATERIALS FROM MIXTURES OF CRYSTALLINE AND NON-CRYSTALLINE ORGANO SILICON POLYMERS

Darryl T. Hansen, Midland, Mich., assignor to Dow Corning Corporation, Midland, Mich., a corporation of Michigan
No Drawing. Filed July 22, 1963, Ser. No. 296,486
17 Claims. (Cl. 260—37)

This invention relates to heat-shrinkable organopolysiloxane mixtures and other articles made therefrom.

The term "heat-shrinkable" has reference to the contraction of an article to predetermined dimensions under the influence of heat. A mixture of a vulcanized elastomeric siloxane and a crystalline polymer can be heated above the melting temperature of the crystalline ingredient, expanded by a predetermined amount and then cooled below the melting point of the crystalline ingredient. The so formed article will not return to its original dimensions, but will remain in an extended configuration. However, when the article is again heated to a temperature above the melting point of the crystalline ingredient the article will contract to its original dimensions. Such a phenomena makes it possible to fabricate articles of great commercial value. For example, if the article is in the form of a tube, the expanded tube can be applied over a base member such as an electric conductor and then heated. The tube will shrink to fit tightly around the conductor forming an excellent insulating jacket.

This phenomenon is exhibited by some but not all silicone elastomer-thermo-plastic resin combinations. Furthermore, in general, silicone elastomer-thermo-plastic silicone resin combinations, such as those described in Belgian Patent No. 609,815, suffer from a serious deficiency, namely, that the property of heat-shrinkability is lost with time. This is a serious disadvantage in the commercial exploitation of the phenomenon since heat-shrinkable articles which are fabricated and sold will no longer operate as desired when the customer attempts to use them.

It is the object of this invention to provide materials and articles which are heat-shrinkable and which retain the heat-shrinkable property for long periods of time (i.e., the heat-shrinkable articles are "stable"). Another object is to provide heat-shrinkable elastomeric silicone materials which exhibit optimum mechanical and thermal properties. Another object is to provide heat-shrinkable articles which will shrink at temperatures below 175° C., which is often required in the art. Other objects and advantages will be apparent from the following description.

This invention relates to a material capable of forming stable heat-shrinkable articles consisting essentially of (1) a diorganopolysiloxane in which the organic substituents are selected from the group consisting of phenyl, methyl, vinyl and 3,3,3-trifluoropropyl radicals, at least 50 percent of the total number of substituents being methyl and not more than 10 percent of the total number being vinyl and (2) from 1 to 100 percent based on the weight of (1) of a polymeric material of the formula

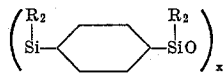

in which R is selected from the group consisting of phenyl and methyl radicals and $x$ has an average value of at least 50.

As can be seen the compositions employed in this invention are mixtures of a polydiorganosiloxane and a polysilphenylenesiloxane. The molecular weight of the polydiorganosiloxane (1) should be sufficiently high so that reasonably strong rubbers are obtained upon vulcanizing the product. In general, the molecular weight of (1) is such that the viscosity of the polymer is at least 1,000 cs. at 25° C. and preferably the viscosity is in excess of 1,000,000 cs. The latter are generally referred to in the siloxane art as a gum. These organosiloxanes are well known materials of commerce. It should be understood that the polymers (1) are composed essentially of diorganosiloxane units, but as is well known these polymers can obtain small amounts of monoorganosiloxane units of $SiO_2$ units, and in addition they can have triorganosilyl groups on the ends of the chain. Such modified diorganosiloxanes are within the scope of the claims.

As can be seen, the polymers (1) of this invention can be dimethylsiloxane homopolymers, trifluoropropylmethylsiloxane homopolymers, or phenylmethylisolxane homopolymers, or copolymers of any of these together with copolymers containing limiting amounts of methylvinylsiloxane, phenylvinylsiloxane and diphenylsiloxane. It should also be understood that the polymer chains can be endblocked with triorganosilyl units such as trimethylsilyl, vinyldimethlsilyl, phenylmethylvinylsilyl, diphenylmethylsilyl and trifluoropropyldimethylsilyl.

The second critical ingredient of the compositions of this invention is the silphenylene polymers of the formula

in which R can be phenyl or methyl. Specific examples of such polymers are those consisting essentially of units of the formulae

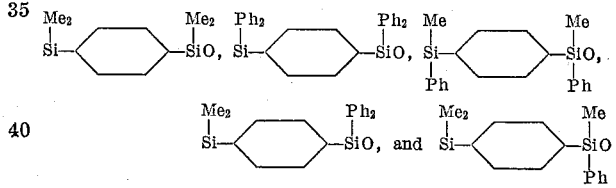

The molecular weight of these polymers should be such that the average degree of polymerization is at least 50. Polymers having lower molecular weights and silphenylene monomers give inferior products.

The term consisting essentially of with respect to polymer (2) means that the polymer is composed primarily of the silphenylenesiloxane units shown but that the polymers can contain other siloxane units such as trimethylsiloxane-endblocking units or dimethylsiloxane copolymerized units provided the presence of such units do not cause the loss of the ability of said copolymers to form in conjunction with (1) stable heat-shrinkable articles. Such modified silphenylene polymers are included within the claims appended hereto.

In cases where a copolymer of silphenylenesiloxane containing a minor amount of copolymerized dimethylsiloxane, phenylmethylsiloxane, trifluoropropylmethylsiloxane, etc. in used as (2), the proportions 1 to 100 percent by weight refer to the percent of silphenylene in the copolymer based on the weight of (1). Such copolymers have to be crystalline in order to operate in this invention and they can be prepared by known procedures.

The compositions of this invention can contain any of the well known fillers employed in siloxane elastomers. Optimum physical properties are obtained by employing reinforcing silica fillers having surface areas in excess of 100 m.²/g. such as fume silica, silica aerogels or finely divided precipitated silicas made from alkali metal silicates by reacting the silicates with acid. However, the composition of this invention can also contain extending fillers such as diatomaceous earth, crushed quartz; and metal oxides such as $TiO_2$, zinc oxide, ferric oxide or magnesium oxide. If desired, the surface of the fillers can have organosilyl groups attached thereto.

This invention also relates to articles of manufacture which are heat-shrinkable and which consist essentially of (1) a cross-linked polydiorganosiloxane in which the substituents are selected from the group consisting of methyl, phenyl, vinyl and 3,3,3-trifluoropropyl radicals, at least 50 mol percent of the substituents being methyl and not more than 10 percent of the total number being vinyl and dispersed therein, (2) from 1 to 100 percent by weight based on the weight of (1) of a polymer of the formula

in which R is methyl or phenyl, and $x$ has an average value of at least 50.

These articles are prepared by mixing ingredients (1) and (2) in the desired proportion, forming the mixture into the shape of the desired article and then vulcanizing in any suitable manner. For example, (1) can be mixed with a filler and/or vulcanizing agent and the resulting mix blended with (2) or (2) can be mixed with a filler and/or vulcanizing agent and then mixed with (1) or a filler and/or vulcanizing agent can be blended with both (1) and (2) prior to mixing them. After the formed article has been vulcanized it is then heated to a temperature above the melting point of the silphenylene polymer and expanded or elongated to the desired extent. The article is then cooled to a temperature below the melting point of the silphenylene polymer and the expanding or elongation force is removed. The finished article will retract only a slight extent and will then remain in an extended position until it is heated above the melting point of the silphenylene polymer. At that point the article then contracts to its original dimensions.

Alternatively the article can be vulcanized, extended to the desired extent and then held in the extended position while the temperature is raised above the melting point of the silphenylene polymer and then cooled below the melting point of the polymer. The extending force is then relieved and the article will remain extended except for slight contraction.

Any vulcanizing technique normally employed with silicone rubbers can be employed in vulcanizing the compositions of this invention. This includes vulcanizing by means of radiation such as X-rays, gamma-rays or electrons, or vulcanizing by chemical reagents such as peroxides or combinations of alkoxy silicates and metal salts of carboxylic acids, or by employing polysiloxanes having acyl groups on the ends of the chain. In the latter two cases the curing mechanism is by way of spontaneous vulcanization upon exposure to moisture. All of these methods are well known in the art.

The preferred method of vulcanization involves the use of the well known peroxides such as benzoyl peroxide, 2,4-dichlorobenzoyl peroxide, ditertiarybutylperbenzoate, ditertiarybutylperoxide, and the like.

It should be understood that the compositions and articles of this invention can contain other ingredients such as pigments, oxidation inhibitors, thermal stability additives and other materials which are normally employed in siloxane elastomers.

The articles of this invention are particularly useful in the fabrication of insulating jackets for electrical conductors, especially where complicated shapes are involved which prohibit fabrication by extrusion. The materials of this invention are also useful as ablative coatings on cables and other base members.

The following examples are illustrative only and should not be construed as limiting the invention which is properly delineated in the appended claims.

EXAMPLE 1

Siloxane polymer (1) employed in this example was a gum composed of a dimethylvinylsilyl-endblocked copolymer of dimethylsiloxane containing a small amount of phenylmethylsiloxane and methylvinylsiloxane. 100 parts of this copolymer was mixed with 60 parts of a trimethylsiloxy-treated silica having a surface area of about 300 m.$^2$/g. and 3 parts of ferric oxide together with sufficient polymer of the formula

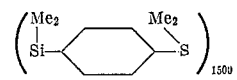

to give the amounts of silphenylene polymer shown in the table below. In each case the mixture was mixed on a mill. In general, warming the mill was required in order to obtain a uniform blend. The mixture was then cooled and the proportions of vulcanizing agent 2,5-bis(tertiary-butylperoxy)-2,5-dimethylhexane was added as shown below.

In runs 3 through 7 inclusive, the resulting mixture was formed into a slab and then vulcanized by heating 4 hours at 250° C. The physical properties of the vulcanized material were determined and a slab was then heated to 150° C. and extended 200 percent in length. Each sample was held in the extended position while being cooled to room temperature. The tension was then released and the percent of elongation retained was noted as shown below. In each case the sample was again heated to 150° C. whereupon it immediately returned to its original dimension.

In runs 1 and 2 the formulated material was extruded in the form of a tube and then vulcanized by heating 4 hours at 250° C. The tube was then heated to 150° C. and expanded in diameter 200 percent. The pressure was maintained as the tube was cooled to room temperature and then released. The percent of the extended diameter which was retained is shown below. Each tube was then heated to 150° C. and the diameter of the tube immediately shrunk to its original value.

TABLE

| Runs | Percent by wt. silphenylene polymer based on the weight of (1) | Parts by wt. vulcanizing agent based on the wt. of 100 parts of (1) | Durometer | Tensile at break, p.s.i. | Percent elongation at break | Tear strength, lbs./in.* | Percent of elongation retained |
|---|---|---|---|---|---|---|---|
| 1 | 48 | 2 | 80 | 1,590 | 410 | 171 | 180 |
| 2 | 64 | 2 | 84 | 1,737 | 397 | 266 | 190 |
| 3 | 48 | 1 | 81 | 1,640 | 427 | 257 | 180 |
| 4 | 24 | 1 | 68 | 1,533 | 490 | 374 | 150 |
| 5 | 16 | 1 | 60 | 1,477 | 540 | 314 | 119 |
| 6 | 8.6 | 1 | 56 | 1,473 | 560 | 233 | 75 |
| 7 | 3.3 | 1 | 57 | 1,403 | 560 | 248 | 50 |

*Per inch of sample thickness.

EXAMPLE 2

100 parts of a gum composed of 3,3,3-trifluoropropylmethylpolysiloxane containing a small amount of methylvinylsiloxane, 42 parts of a fume silica, 18.7 parts of a low molecular weight hydroxylated trifluoropropylmethylsiloxane fluid and 3.4 parts of cerium hydroxide were milled together with sufficient of the silphenylene polymer of Example 1 to give 33 percent by weight silphenylene polmer based on the weight of the trifluoropropylmethylsiloxane gum. The mixture was then mixed with 4.17 parts by weight of 2,4-dichlorobenzoyl peroxide, molded into a slab and heated 4 hours at 250° C. Resulting material had the following properties:

Durometer _____ 65
Tensile strength _____ p.s.i.__ 709
Elongation at break _____ percent__ 327
Tear strength _____ lbs./in__ 153

A slab of the material was heated to 150° C. and then elongated 100 percent. The elongated material was cooled to room temperature and the tension released and whereupon the sample shrunk only 6 percent showing an elongation retention of 94 percent. The extended slab was then heated to 150° C. and it immediately shrunk to its original dimensions.

EXAMPLE 3

100 parts of a gum composed of a copolymer of dimethylsiloxane of a small amount of methylvinylsiloxane was molded with 27 parts of fume silica, 12 parts of diatomaceous earth, 5 parts of barium ziroconate and 1 part zinc oxide together with sufficient of the silphenylene polymer of Example 1 to give 30 percent by weight of said polymer based on the weight of the gum. Resulting product was then mixed with 2.5 parts by weight 2,4-dichlorobenzoyl peroxide and formed into a slab and heated 4 hours at 250° C. The properties were:

Durometer _____ 64
Tensile strength _____ p.s.i__ 1270
Elongation at break _____ percent__ 423
Tear strength _____ lbs./in__ 119

The vulcanized slab was heated to 150° C. and extended 100 percent and cooled whereupon it retracted only 6 percent. The extended material immediately returned to its original length when it was again heated to 150° C.

EXAMPLE 4

100 parts of a gum composed of dimethylsiloxane together with a small amount of phenylmethylsiloxane, 55 parts of fume silica, 16 parts of a low molecular weight hydroxylated dimethylsiloxane fluid, 4 parts of ferric oxide and sufficient silphenylene polymer of Example 1 to give a 35 percent by weight based on the weight of the gum were mixed. The mixture was then milled with 2.5 parts by weight 2,4-dichlorobenzoyl peroxide and cured 4 hours at 250° C. The properties were:

Durometer _____ 72
Tensile strength _____ p.s.i__ 1123
Elongation at break _____ percent__ 407
Tear strength _____ lbs./in__ 146
Elongation retained _____ percent__ 66

The sample immediately returned to its unstretched condition when again heated to 150° C.

EXAMPLE 5

100 parts by weight of a gum composed of dimethylsiloxane and small amount of diphenylsiloxane and methylvinylsiloxane was milled with 65 parts of a trimethylsiloxy treated silica filler having a surface area of about 400 m.²/g., 1 part TiO₂ and sufficient of the silphenylene polymer of Example 1 to give 33.3 percent by weight based on the weight of the gum. The mixture was then milled with 3.33 parts of 2,4-dichlorobenzoyl peroxide and cured 4 hours at 250° C. The properties were:

Durometer _____ 63
Tensile strength _____ p.s.i__ 1557
Elongation at break _____ percent__ 543
Tear strength _____ lbs./in__ 364
Elongation retained _____ percent__ 80

The material was heat-shrinkable.

EXAMPLE 6

100 parts of a gum composed of dimethylsiloxane units with small amounts of diphenylsiloxane units, methylvinylsiloxane units and having dimethylvinylsilyl units on the ends of the molecule was milled with 45 parts of fume silica, 10 parts of low molecular weight hydroxylated dimethylsiloxane, ½ part of TiO₂ and sufficient of the silphenylene polymer of Example 1 to give 32 percent by weight based on the weight of the gum. The mixture was then milled with 2 parts by weight of 2,4-dichlorobenzoyl peroxide and cured 4 hours at 250° C. The properties were:

Durometer _____ 70
Tensile strength _____ p.s.i.__ 1147
Elongation at break _____ percent__ 427
Tear strength _____ lbs./in__ 239

The sample was then heated 150° C. and stretched 200 percent, then cooled and the tension released. The sample shrunk only 19 percent so that its elongation retention was 181 percent. The material shrunk to its original dimension when it was heated again at 150° C.

EXAMPLE 7

100 parts by weight of a gum composed of dimethylsiloxane with a small amount of copolymerized phenylmethylsiloxane and vinylmethylsiloxane was milled with 60 parts by weight of fume silica and 3 parts ferric oxide together with a polymer of the formula

in amount to give 32.9 percent of said polymer based on the weight of the gum. The mixture was then milled with 4.2 parts of 2,4-dichlorobenzoyl peroxide and cured 4 hours at 250° C. The properties were:

Durometer _____ 63
Tensile strength _____ p.s.i.__ 1030
Elongation at break _____ percent__ 320
Tear strength _____ lbs./in__ 221

The vulcanized sample was heated to 150° C. elongated 100 percent and then cooled to room temperature. The material retracted 31.2 percent so that the extension retained was 68.8 percent. When the sample was again heated to 150° C. it shrunk to its original dimensions.

EXAMPLE 8

Equivalent results are obtained when the silphenylene polymer of the formula

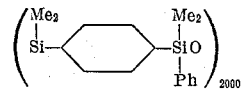

is employed in the procedure in Example 2.

That which is claimed is:
1. A heat-shrinkable composition consisting essentially of a mixture of
  (1) a diorganopolysiloxane in which the organic substituents are selected from the group consisting of methyl, vinyl, phenyl and 3,3,3-trifluoropropyl radicals, at least 50 percent of the substituents being methyl and not more than 10 percent of the total number being vinyl and
  (2) from 1 to 100 percent based on the weight of (1) of a polymer of the formula

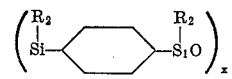

in which R is selected from the group consisting of phenyl and methyl radicals and $x$ has an average value of at least 50.

2. A heat-shrinkable composition consisting essentially of a mixture of
   (1) a diorganopolysiloxane in which the organic substituents are selected from the group consisting of methyl, vinyl, phenyl and 3,3,3-trifluoropropyl radicals, at least 50 percent of the substituents being methyl and no more than 10 percent of the total number being vinyl,
   (2) from 1 to 100 percent based on the weight of (1) of a polymer of the formula

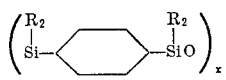

in which R is selected from the group consisting of phenyl and methyl radicals and $x$ has an average value of at least 50, and
   (3) a filler.

3. A composition in accordance with claim 2 wherein the filler is a reinforcing silica filler.

4. A heat-shrinkable composition consisting essentially of
   (1) a methylvinylpolysiloxane in which at least 50 percent of the substituents are methyl and not more than 10 percent of the total number are vinyl, and
   (2) from 1 to 100 percent based on the weight of (1) of a polymer of the formula

where $x$ has an average value of at least 100.

5. A heat-shrinkable composition consisting essentially of
   (1) a methylvinylpolysiloxane in which at least 50 percent of the substituents are methyl and not more than 10 percent of the total number are vinyl,
   (2) from 1 to 100 percent based on the weight of (1) of a polymer of the formula

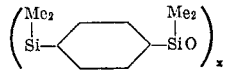

where $x$ has an average value of at least 100, and
   (3) a reinforcing silica filler.

6. A heat-shrinkable composition consisting essentially of
   (1) a methylphenylvinylpolysiloxane in which at least 50 percent of the substituents are methyl and no more than 10 percent of the total number are vinyl, and
   (2) from 1 to 100 percent based on the weight of (1) of a polymer of the formula

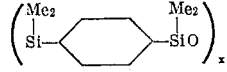

where $x$ has an average value of at least 100.

7. A heat-shrinkable composition consisting essentially of
   (1) a methylphenylpolysiloxane in which at least 50 percent of the substituents are methyl radicals, and
   (2) from 1 to 100 percent by weight based on the weight of (1) of

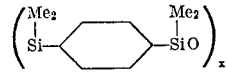

where $x$ has an average value of at least 100.

8. A heat-shrinkable composition consisting essentially of
   (1) a methylphenylpolysiloxane in which at least 50 percent of the substituents are methyl radicals,
   (2) from 1 to 100 percent by weight based on the weight of (1)

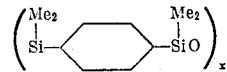

where $x$ has an average value of at least 100, and
   (3) a reinforcing silica filler.

9. A heat-shrinkable composition consisting essentially of
   (1) a methylvinylphenylpolysiloxane in which at least 50 percent of the substituents are methyl radicals and no more than 10 percent of the total are vinyl,
   (2) from 1 to 100 percent by weight based on the weight of (1) of

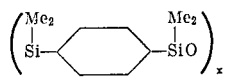

in which $x$ has an average value of at least 100 and
   (3) a reinforcing silica filler.

10. A heat-shrinkable composition consisting essentially of
    (1) a copolymer of 3,3,3-trifluoropropylmethylsiloxane and methylvinylsiloxane, there being no more than 10 mol percent methylvinylsiloxane and
    (2) from 1 to 100 percent by weight based upon the weight of (1) of

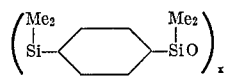

where $x$ has an average value of at least 100.

11. A heat-shrinkable composition consisting essentially of
    (1) a copolymer of 3,3,3-trifluoropropylmethylsiloxane and methylvinylsiloxane, there being no more than 10 mol percent methylvinylsiloxane,
    (2) from 1 to 100 percent by weight based upon the weight of (1) of

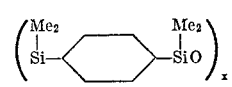

where $x$ has an average value of at least 100 and
    (3) a reinforcing silica filler.

12. A heat-shrinkable article consisting essentially of
    (1) a cross-linked polydiorganosiloxane in which the substituents are selected from the group consisting of methyl, phenyl, vinyl and 3,3,3-trifluoropropyl radicals, at least 50 percent of the total substituents being methyl and no more than 10 percent of the total being vinyl and
    (2) from 1 to 100 percent by weight based on the weight of (1) of a polymer of the formula

where R is selected from the group consisting of methyl and phenyl radicals and $x$ has an average value of at least 50.

13. A heat-shrinkable article consisting essentially of
    (1) a cross-linked polydiorganosiloxane in which the substituents are selected from the group consisting of methyl, phenyl, vinyl and 3,3,3-trifluoropropyl radicals, at least 50 percent of the total substituents being methyl and no more than 10 percent of the total being vinyl,
    (2) from 1 to 100 percent by weight based on the weight of (1) of a polymer of the formula

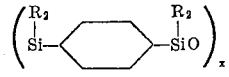

where $x$ has an average value of at least 50 and
    (3) a reinforcing silica filler.

14. A heat-shrinkable article consisting essentially of
    (1) a cross-linked methylphenylvinylpolysiloxane in which at least 50 percent of the substituents are methyl and no more than 10 percent of the total are vinyl, (2) from 1 to 100 percent based on the weight of (1) of

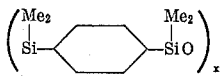

and where x has an average value of at least 100 and
(3) a reinforcing silica filler.

15. A heat-shrinkable article consisting essentially of
(1) a cross-linked methylvinylpolysiloxane in which at least 50 percent of the substituents are methyl and no more than 10 percent are vinyl,
(2) from 1 to 100 percent based on the weight of (1) of

where $x$ has an average value of at least 100 and
(3) a reinforcing silica filler.

16. A heat-shrinkable article consisting essentially of
(1) a cross-linked methylphenylpolysiloxane in which at least 50 percent of the substituents are methyl radicals,
(2) from 1 to 100 percent based on the weight of (1) of

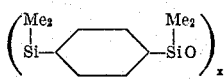

where $x$ has an average value of at least 100 and
(3) a reinforcing silica filler.

17. A heat-shrinkable article consisting essentially of
(1) a cross-linked copolymer of 3,3,3-trifluoropropyl-methylsiloxane and methylvinylsiloxane in which there is no more than 10 mol percent vinylmethylsiloxane,
(2) from 1 to 100 percent based on the weight of (1) of

in which $x$ has an average value of at least 100 and
(3) a reinforcing silica filler.

References Cited by the Examiner

UNITED STATES PATENTS

| | | | |
|---|---|---|---|
| 2,709,692 | 5/1955 | Gainer | 260—46.5 |
| 3,086,954 | 4/1963 | Polmanteer et al. | 260—37 |
| 3,202,634 | 8/1965 | Merker | 260—46.5 |
| 3,249,671 | 5/1966 | Perrone et al. | 264—209 |

MORRIS LIEBMAN, *Primary Examiner.*

J. E. CALLAGHAN, *Assistant Examiner.*